US012203655B1

(12) United States Patent
DiCintio

(10) Patent No.: US 12,203,655 B1
(45) Date of Patent: Jan. 21, 2025

(54) ADDITIVELY MANUFACTURED COMBUSTOR WITH ADAPTIVE COOLING PASSAGE

(71) Applicant: GE Infrastructure Technology LLC, Greenville, SC (US)

(72) Inventor: Richard Martin DiCintio, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/399,838

(22) Filed: Dec. 29, 2023

(51) Int. Cl.
*F23R 3/00* (2006.01)
*F01D 9/02* (2006.01)
*F23R 3/06* (2006.01)

(52) U.S. Cl.
CPC .............. *F23R 3/002* (2013.01); *F01D 9/023* (2013.01); *F23R 3/06* (2013.01); *F05D 2230/31* (2013.01); *F05D 2240/35* (2013.01)

(58) Field of Classification Search
CPC .. F23R 3/002; F23R 3/06; F23R 3/346; F23R 3/283; F01D 9/023
See application file for complete search history.

(56) References Cited

U.S. PATENT DOCUMENTS

| | | | |
|---|---|---|---|
| 5,383,766 | A | 1/1995 | Przirembel et al. |
| 5,813,836 | A | 9/1998 | Starkweather |
| 6,047,550 | A | 4/2000 | Beebe |
| 6,192,688 | B1 | 2/2001 | Beebe |
| 6,206,638 | B1 | 3/2001 | Glynn et al. |
| 6,868,676 | B1 | 3/2005 | Haynes |
| 7,568,887 | B1 | 8/2009 | Liang |
| 7,854,591 | B2 | 12/2010 | Liang |
| 8,112,216 | B2 | 2/2012 | Davis, Jr. et al. |
| 8,167,559 | B2 | 5/2012 | Liang |
| 8,402,768 | B2 | 3/2013 | Syed et al. |
| 8,677,753 | B2 | 3/2014 | Melton et al. |
| 8,683,808 | B2 | 4/2014 | Venkataraman et al. |
| 8,701,382 | B2 | 4/2014 | Davis, Jr. et al. |
| 8,701,383 | B2 | 4/2014 | Venkataraman et al. |
| 8,701,418 | B2 | 4/2014 | Venkataraman et al. |
| 8,707,707 | B2 | 4/2014 | Venkataraman et al. |

(Continued)

FOREIGN PATENT DOCUMENTS

EP 3232002 A1 10/2017

*Primary Examiner* — Katheryn A Malatek
(74) *Attorney, Agent, or Firm* — James Pemrick; Charlotte Wilson; Hoffman Warnick LLC

(57) ABSTRACT

A combustor for a gas turbine system includes an additively manufactured (AM) combustor body including a one-piece member that defines a combustion liner and a transition piece at an aft end of the combustion liner. A thermal barrier coating (TBC) is disposed over an inner surface of the combustor body. Adaptive cooling passage(s) are defined in the combustion liner and/or transition piece. Each adaptive cooling passage includes an open end in fluid communication with a coolant air source and a terminating end in the body spaced from the inner surface by a distance. When a spall in the TBC occurs at a location adjacent the terminating end and the high temperature of the body reaches or exceeds a predetermined temperature, the terminating end opens at the location through the distance to allow a flow of the coolant air through to an inside of the AM combustor body.

15 Claims, 6 Drawing Sheets

(56) References Cited

U.S. PATENT DOCUMENTS

| | | | |
|---|---|---|---|
| 8,931,280 B2 | 1/2015 | Kaleeswaran et al. | |
| 9,052,115 B2 | 6/2015 | Stoia et al. | |
| 9,097,424 B2 | 8/2015 | Chen et al. | |
| 9,140,455 B2 | 9/2015 | Stoia et al. | |
| 9,151,500 B2 | 10/2015 | Chen et al. | |
| 9,284,888 B2 | 3/2016 | Romig et al. | |
| 9,316,396 B2 | 4/2016 | DiCintio et al. | |
| 9,447,971 B2 | 9/2016 | Kim et al. | |
| 9,617,859 B2 | 4/2017 | Morgan et al. | |
| 9,938,903 B2 | 4/2018 | Hughes et al. | |
| 9,945,294 B2 | 4/2018 | Hughes et al. | |
| 9,945,562 B2 | 4/2018 | Hughes et al. | |
| 9,976,487 B2 | 5/2018 | Hughes et al. | |
| 9,989,260 B2 | 6/2018 | Hughes et al. | |
| 9,995,221 B2 | 6/2018 | Hughes et al. | |
| 10,006,367 B2 | 6/2018 | Romanov et al. | |
| 10,100,646 B2 | 10/2018 | Propheter-Hinckley et al. | |
| 10,220,474 B2 | 3/2019 | Theuer et al. | |
| 10,228,138 B2 | 3/2019 | Theuer et al. | |
| 10,364,681 B2 | 7/2019 | Krumanaker et al. | |
| 10,704,399 B2 | 7/2020 | Lacy et al. | |
| 10,760,430 B2 | 9/2020 | Lacy et al. | |
| 10,927,680 B2 | 2/2021 | Lacy et al. | |
| 11,021,969 B2 | 6/2021 | Krumanaker et al. | |
| 11,041,389 B2 | 6/2021 | Lacy et al. | |
| 11,187,415 B2 | 11/2021 | Jones et al. | |
| 11,371,699 B2 | 6/2022 | Bolanos Chaverri et al. | |
| 11,434,821 B2 | 9/2022 | Wertz | |
| 11,566,536 B1 | 1/2023 | Cox | |
| 11,767,766 B1 | 9/2023 | Matthews et al. | |
| 2018/0187607 A1* | 7/2018 | Hughes | F02C 7/222 |
| 2018/0347378 A1* | 12/2018 | Lacy | F01D 5/187 |
| 2019/0120064 A1 | 4/2019 | Jennings et al. | |
| 2019/0178497 A1* | 6/2019 | Jones | F23R 3/002 |
| 2022/0333776 A1* | 10/2022 | Rybak-Tucholska | F01D 9/023 |

* cited by examiner

ADDITIVELY MANUFACTURED COMBUSTOR WITH ADAPTIVE COOLING PASSAGE

TECHNICAL FIELD

The disclosure relates generally to turbomachine combustors and, more specifically, to an additively manufactured combustor component with an adaptively opening cooling passage.

BACKGROUND

Gas turbine systems includes a combustion section including a plurality of combustors in which fuel is combusted to create a flow of combusted gas that is converted to kinetic energy in a downstream turbine. In each combustor, a combustion liner and a transition piece, which collectively define the combustion chamber, are exposed to a working fluid, e.g., combustion gases, at high temperatures. A thermal barrier coating (TBC) is used on an inner surface of the combustion liner or transition piece to protect the parts, and a coolant air may be passed over an exterior of the combustion liner and/or transition piece to cool the parts.

Although many models and simulations may be performed before a given combustor is put into operation in the field, the exact temperatures to which the combustor may reach vary greatly due to combustor-specific hot and cold locations, fuel used, and cooling air flow temperatures and volumes, among other factors. Specifically, the combustor may have temperature dependent properties that may be adversely affected by overheating. Insufficient cooling may result in undue stress and oxidation of the combustion liner or transition piece, which may lead to fatigue and/or damage. If a break or crack, referred to as a spall, occurs in the TBC of the combustion liner or transition piece, the local temperature of the part at the spall may rise to a harmful temperature. This situation may arise even though internal cooling passages are present within the combustion liner or transition piece at the location of the spall. Improved cooling techniques for components exposed to combustion gases is desired in the art.

BRIEF DESCRIPTION

All aspects, examples and features mentioned below can be combined in any technically possible way.

An aspect of the disclosure provides a combustor for a gas turbine system, the combustor comprising: an additively manufactured (AM) combustor body including a one-piece member including a combustion liner and a transition piece at an aft end of the combustion liner, wherein the AM combustor body has an inner surface and includes a plurality of parallel, sintered metal layers; a thermal barrier coating over the inner surface, the thermal barrier coating exposed to a working fluid having a high temperature; and at least one adaptive cooling passage defined in at least one of the combustion liner and the transition piece, wherein each adaptive cooling passage includes an open end in fluid communication with a coolant air source and a terminating end in the AM combustor body spaced from the inner surface by a distance; wherein, in response to a spall in the thermal barrier coating occurring at a location adjacent the terminating end and the high temperature reaching or exceeding a predetermined temperature of the AM combustor body, the terminating end opens at the location through the distance to allow a flow of the coolant air through to an inside of the AM combustor body.

Another aspect of the disclosure includes any of the preceding aspects, and the AM combustor body further includes at least one flow sleeve surrounding at least part of the combustion liner and at least one axial fuel stage (AFS) injector mount integral with the AM combustor body.

Another aspect of the disclosure includes any of the preceding aspects, and further comprising a cooling passage that extends adjacent at least a portion of the at least one AFS injector mount and is in fluid communication with the at least one adaptive cooling passage.

Another aspect of the disclosure includes any of the preceding aspects, and the coolant air source includes a flow passage between the at least one flow sleeve and an exterior of the combustion liner or the transition piece.

Another aspect of the disclosure includes any of the preceding aspects, and the AM combustor body includes at least one fuel passage extending longitudinally in the at least one flow sleeve from a forward end thereof to the at least one AFS injector.

Another aspect of the disclosure includes any of the preceding aspects, and the AM combustor body further includes an aft frame at an aft end of the transition piece.

Another aspect of the disclosure includes any of the preceding aspects, and further comprising a separate head end fuel nozzle assembly coupled to a forward end of the AM combustor body.

Another aspect of the disclosure includes a gas turbine (GT) system, comprising: a compressor section; a combustion section operatively coupled to the compressor section; and a turbine section operatively coupled to the combustion section, wherein the combustion section includes at least one combustor including an additively manufactured (AM) combustor body including a one-piece member including a combustion liner and a transition piece at an aft end of the combustion liner, wherein the AM combustor body has an inner surface and includes a plurality of parallel, sintered metal layers; a thermal barrier coating over the inner surface, the thermal barrier coating exposed to a working fluid having a high temperature; and at least one adaptive cooling passage defined in at least one of the combustion liner and the transition piece, wherein each adaptive cooling passage includes an open end in fluid communication with a coolant air source and a terminating end in the AM combustor body spaced from the inner surface by a distance; wherein, in response to a spall in the thermal barrier coating occurring at a location adjacent the terminating end and the high temperature reaching or exceeding a predetermined temperature of the AM combustor body, the terminating end opens at the location through the distance to allow a flow of the coolant air through to an inside of the AM combustor body.

Another aspect of the disclosure includes any of the preceding aspects, and the AM combustor body further includes at least one flow sleeve surrounding at least part of the combustion liner and at least one axial fuel stage (AFS) injector mount integral with the AM combustor body.

Another aspect of the disclosure includes any of the preceding aspects, and further comprising a cooling passage that extends adjacent at least a portion of the at least one AFS injector mount and is in fluid communication with the at least one adaptive cooling passage.

Another aspect of the disclosure includes any of the preceding aspects, and wherein the coolant air source includes a flow passage between the at least one flow sleeve and an exterior of the combustion liner or the transition piece.

Another aspect of the disclosure includes any of the preceding aspects, and the AM combustor body includes at least one fuel passage extending longitudinally in the at least one flow sleeve from a forward end thereof to the at least one AFS injector.

Another aspect of the disclosure includes any of the preceding aspects, and the AM combustor body further includes an aft frame at an aft end of the transition piece.

Another aspect of the disclosure includes any of the preceding aspects, and further comprising a separate head end fuel nozzle assembly coupled to a forward end of the AM combustor body.

Another aspect of the disclosure includes any of the preceding aspects, and the combustion section includes a plurality of combustors, each combustor including the AM combustor body.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
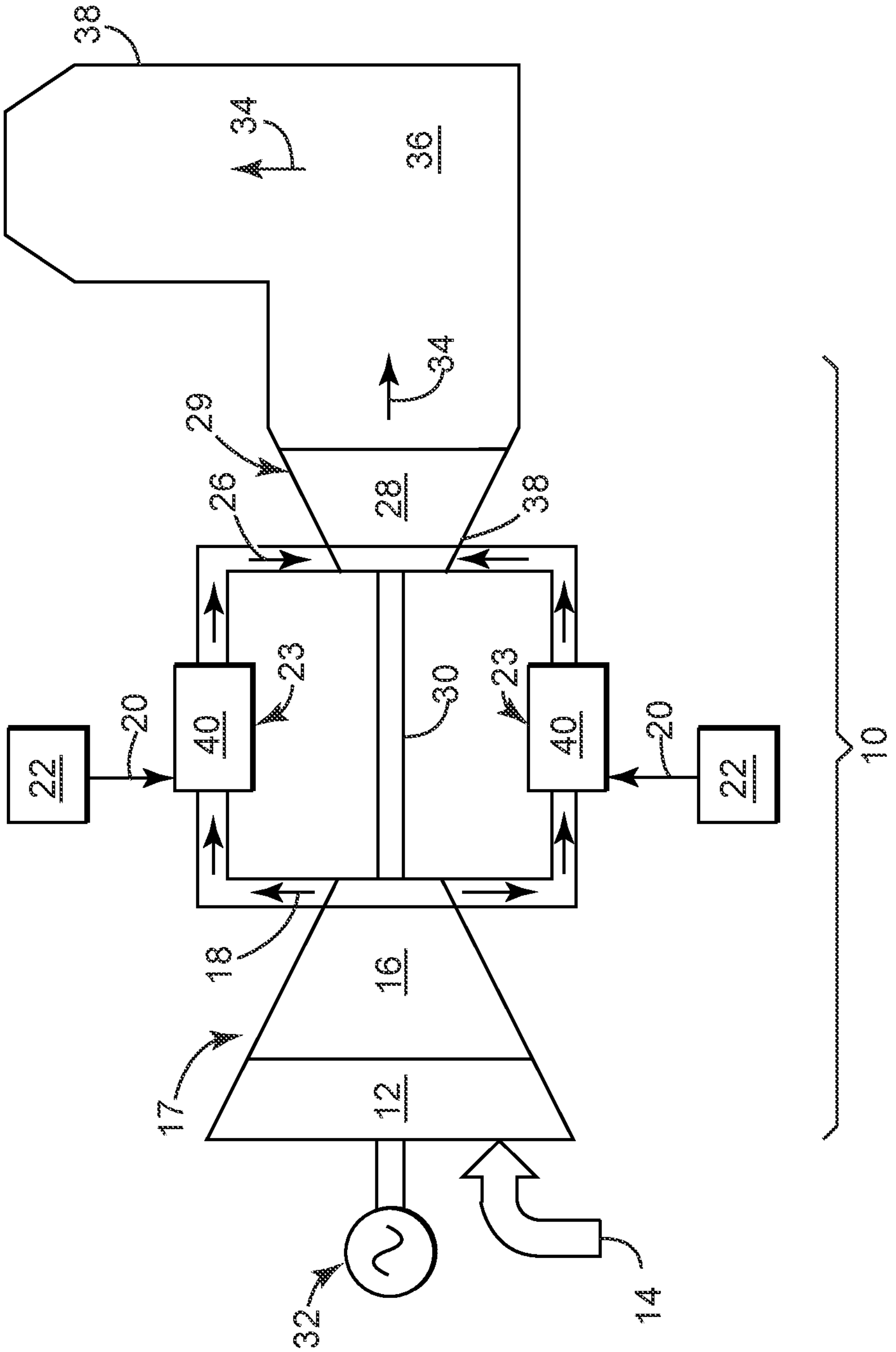
FIG. 1 Prior Art
FIG. 1 shows a block diagram of an illustrative gas turbine system capable of use with a combustor and combustor body according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

The term "axial" refers to movement or position parallel to an axis, e.g., an axis of a combustor or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a combustion liner or a circumferential interior of casing extending about a combustor. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," "directly coupled to," or "directly mounted to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure include a combustor for a gas turbine system. The combustor includes an additively manufactured (AM) combustor body including a one-piece member including a combustion liner and a transition piece at an aft end of the combustion liner. The AM combustor body includes a plurality of parallel, sintered metal layers. A thermal barrier coating (TBC) is provided over an inner surface of the AM combustor body. Adaptive cooling passage(s) are defined in the combustion liner and/or transition piece. Each adaptive cooling passage includes an open end in fluid communication with a coolant air source and a terminating end in the AM combustor body spaced from the inner surface by a distance. When a spall in the TBC occurs at a location adjacent the terminating end and the high temperature of the AM combustor body reaches or exceeds a predetermined temperature, the terminating end opens at the location through the distance to allow a flow of the coolant air through to an inside of the AM combustor body.

The AM combustor body extends a lifespan of the combustor by providing adaptive cooling when spalls occur. The adaptive cooling does not impact GT system efficiency and is inexpensive to implement with additive manufacturing. The additive manufacturing also lowers the costs of the combustor body by eliminating numerous parts and many of the required assembly steps. The AM combustor body also provides improved durability compared to conventional versions by eliminating welds and providing the ability to design out stress-rising geometries, e.g., a high-stress weld between the aft end of the transition piece and an aft frame of the combustor. Additive manufacturing also allows for quick and easy manufacturing updates, e.g., to position adaptive cooling passages where necessary in different combustor models.

FIG. 1 shows a block diagram of an illustrative gas turbine (GT) system 10 that may incorporate various embodiments of a combustor 40 of the present disclosure. As shown, GT system 10 generally includes an inlet section 12 that may include a series of filters, cooling coils, moisture separators, and/or other devices to purify and otherwise condition a working fluid (e.g., air) 14 entering GT system 10. Working fluid 14 flows to a compressor 16 in a compressor section 17 that progressively imparts kinetic energy to working fluid 14 to produce a compressed air 18 (hereafter "air 18," "coolant air 18," or "compressed air 18") at a highly energized state. Compressed air 18 is mixed with a fuel 20 from a fuel supply 22 to form a combustible mixture within at least one combustor 40 in a combustion section 23 that is operatively coupled to compressor section 17. Combustion section 23 may include a plurality of combustors 40, each combustor 40 including an additively manufactured combustor body 44, as will be described herein. The combustible mixture is burned to produce combustion gases 26 having a high temperature and pressure.

Combustion gases 26 flow through a turbine 28 of a turbine section 29 operatively coupled to combustion section 23 to produce work. For example, turbine 28 may be connected to a shaft 30 so that rotation of turbine 28 drives compressor 16 to produce compressed air 18. Alternately, or in addition, shaft 30 may connect turbine 28 to a generator 32 for producing electricity. Exhaust gases 34 from turbine 28 flow through an exhaust section 36 that connects turbine 28 to an exhaust stack 37 downstream from turbine 28. Exhaust section 36 may include, for example, a heat recovery steam generator (not shown) for cleaning and extracting additional heat from exhaust gases 34 prior to release to the environment. Where more than one combustor 40 is used, they may be circumferentially spaced around a turbine inlet 38 of turbine 28.

In one embodiment, GT system 10 may include a presently commercially available model from GE Vernova of Cambridge, MA. The present disclosure is not limited to any one particular GT system and may be implanted in connection with other engines including, for example, the other HA, F, B, LM, GT, TM and E-class engine models of GE Vernova, and engine models of other companies. Furthermore, the present disclosure is not limited to any particular turbomachine and may be applicable to, for example, steam turbines, jet engines, compressors, turbofans, etc.

Figures 2, 3:
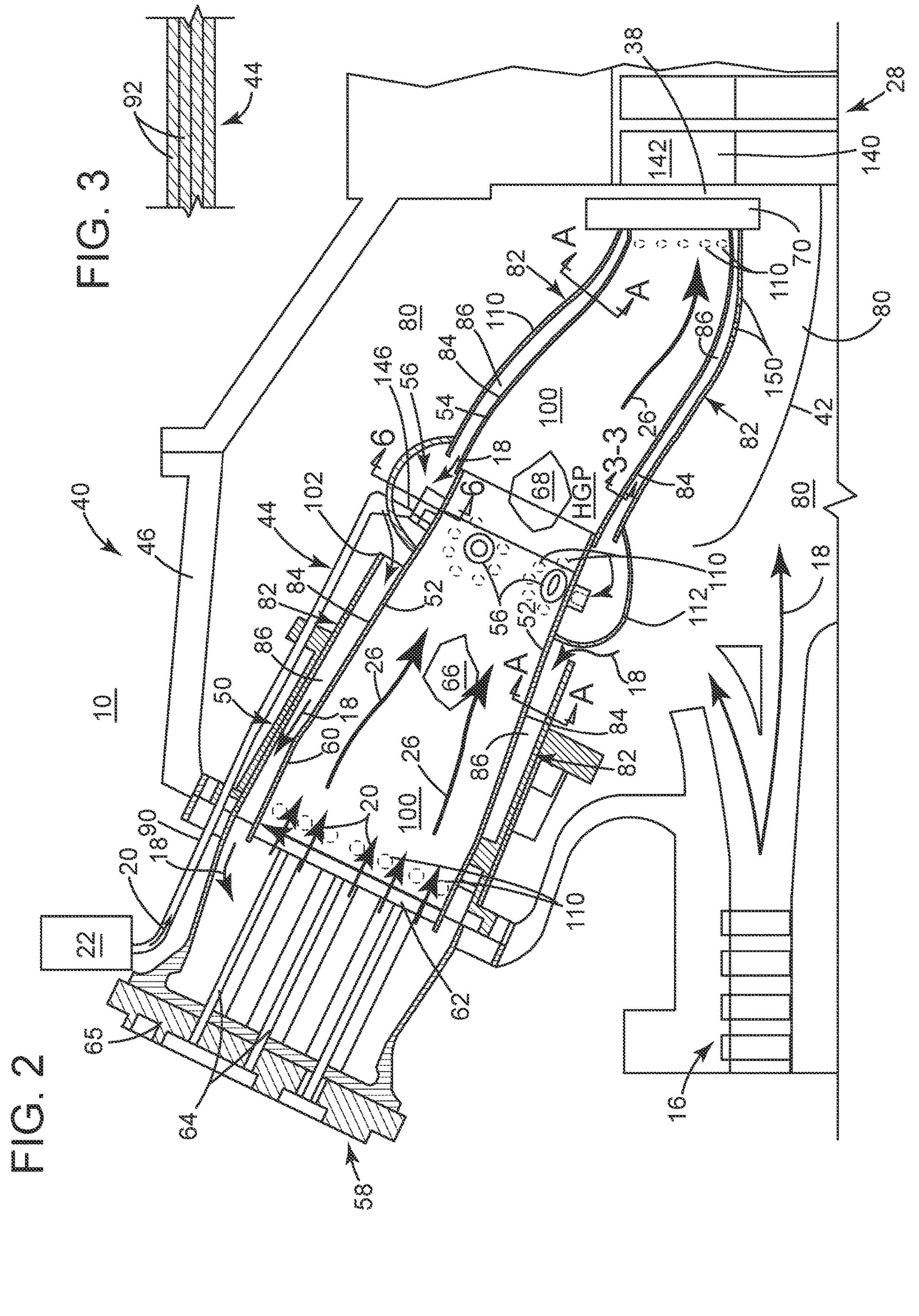
FIG. 2 shows a cross-sectional side view of a portion of a combustor with an additively manufactured combustor body according to embodiments of the disclosure.
FIG. 3 shows a cross-sectional view of a plurality of parallel, sintered metal layers of the combustor body along view line 3-3 in FIG. 2 according to embodiments of the disclosure.

FIG. 2 shows a cross-sectional side view of combustor 40 positioned within GT system 10; FIG. 3 shows a cross-sectional view along view line 3-3 in FIG. 2 of an adaptive cooling passage in combustor body 44. As shown in FIG. 2, combustor 40 is at least partially surrounded by an outer casing 46 such as a compressor discharge casing and/or a turbine casing. An interior of outer casing 46 is in fluid communication with a discharge of compressor 16, creating at least part of a coolant air source 80. Coolant air source 80 may include, among other passages, a flow passage 86 between at least one flow sleeve 82 and an exterior of combustion liner 52 or transition piece 54.

Figure 4:
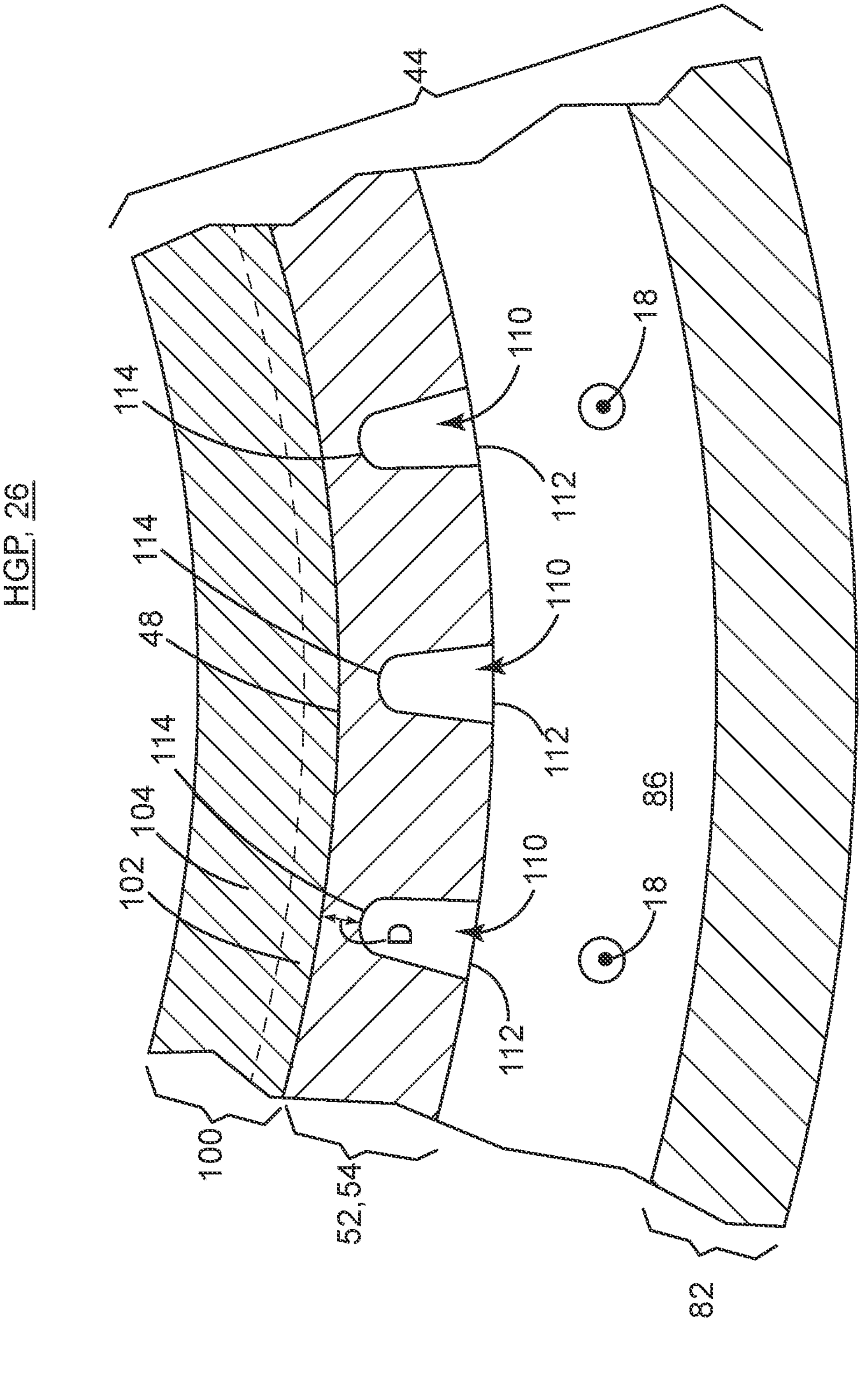
FIG. 4 shows a cross-sectional view along view line A-A in FIG. 2 of a portion of a combustion liner or transition piece of a combustor with an additively manufactured combustor body according to embodiments of the disclosure.

Combustor 40 for GT system 10 includes AM combustor body 44 including a one-piece member 50. One-piece member 50 includes a combustion liner 52 and a transition piece 54 at an aft end (right side as shown in FIG. 2) of combustion liner 52. AM combustor body 44 and, more particularly, combustion liner 52 or transition piece 54 may also include an inner surface 48 (FIG. 4). In certain embodiments, AM combustor body 44 may also include, as part of the one-piece member 50, at least one axial fuel stage (AFS) injector 56 directed into combustion liner 52 and, as will be described herein, an aft frame 70.

Combustion liner 52, also known as a hot gas path (HGP) duct or unibody liner, extends downstream of a separate head end fuel nozzle assembly 58 (hereafter "head end assembly 58") coupled to a forward end 60 of AM combustor body 44. Head end assembly 58 generally includes at least one axially extending fuel nozzle 64 that extends downstream from an end cover 65 and a cap assembly 62 that extends radially and axially within outer casing 46 downstream from end cover 65. Head end assembly 58 may include any now known or later developed axially extending fuel nozzles 64 for delivering fuel 20 to a primary combustion zone 66 from axially extending fuel nozzles 64. In certain embodiments, axially extending fuel nozzle(s) 64 of head end assembly 58 extend at least partially through cap assembly 62 to provide a combustible mixture of fuel and compressed air 18 to primary combustion zone 66.

AFS injectors 56 extend radially through liner 52 downstream from axially extending fuel nozzle(s) 64. Compressed air 18 may be routed to AFS injector(s) 56 to combine with fuel 20 for combustion in a secondary combustion zone 68 that is downstream from primary combustion zone 66. AM combustor body 44 may also include at least one axial fuel stage (AFS) injector mount 57 (FIG. 6), which may be integrally formed with AM combustor body 44. The nozzle portion of AFS injectors 56 may be integrally formed with AFS injector mount 57 or may be coupled thereto. Combustion liner 52 at least partially defines a hot gas path (HGP) for routing combustion gases 26 from primary combustion zone 66 and secondary combustion zone 68 to turbine inlet 38 of turbine 28 during operation of GT system 10.

Transition piece 54 at an aft end of combustion liner 52 transitions the hot gas path (HGP) from the liner's circular cross-section to a more polygonal cross-section of turbine inlet 38 of turbine 28. Combustor 40 may also include aft frame 70 at an aft end (right side in FIG. 2) of transition piece 54.

Combustor 40 may also include at least one flow sleeve 82 surrounding at least part of combustion liner 52. Flow sleeve(s) 82 may also surround transition piece 54. Each flow sleeve 82 is spaced along at least a portion of an exterior surface 84 of combustion liner 52 and/or transition piece 54 and defines a flow passage(s) 86 therein. Flow sleeve(s) 82 may route at least a portion of compressed air 18 from coolant air source 80 to, for example, head end assembly 58 and/or the one or more radially extending AFS injectors 56, where the air is combined with fuel 20 for combustion in primary combustion zone 66 and/or secondary combustion zone 68 that is downstream from primary combustion zone 66.

In certain embodiments, AM combustor body 44 further includes at least one fuel passage 90 extending longitudinally in the at least one flow sleeve 82 from a forward end thereof to AFS injector(s) 56. Fuel passage(s) 90 are integrally formed in flow sleeve(s) 82 and thus in combustor body 44. Fuel passages 90 may operatively couple to fuel supply 22 in any manner to deliver fuel 20 to AFS injector(s) 56. Alternately, fuel passage(s) 90 may be spaced radially outward of flow sleeve 82 and may be printed (i.e., integral with combustor body 44) or may be separate components that extend from fuel supply 22 to AFS injector(s) 56.

As a result of the additive manufacturing, there are no mechanical connections between the various parts (i.e., it is all one-piece). FIG. 3 shows a cross-sectional view of any portion of additively manufactured combustor body 44 (hereafter "AM combustor body 44" or "combustor body 44"). As shown in FIG. 3, AM combustor body 44 includes a plurality of parallel, sintered metal layers 92, e.g., resulting from the additive manufacturing thereof.

FIG. 4 shows a cross-sectional view along view line A-A (two possible locations) in FIG. 2 of a portion of inner surface 48 of combustion liner 52 or transition piece 54 of AM combustor body 44. Combustor 40 may include a thermal barrier coating (TBC) 100 over inner surface 48. TBC 100 is exposed to a working fluid, e.g., combustion gases 26, having a high temperature. TBC 100 may include any now known or later developed thermal barrier material. For example, TBC 100 may include a bond coat layer 102, where necessary, and TBC layer 104. Bond coat layer 102 may include any now known or later developed bond coat material such as but not limited to: nickel or platinum aluminides, nickel chromium aluminum yttrium (NiCrAlY) or nickel cobalt chromium aluminum yttrium (NiCoCrAlY). TBC layer 104 may include any now known or later developed TBC material such as but not limited to: a rare earth doped zirconium oxide, cobalt-nickel-chrome-aluminum-yttrium (CoNiCrAlY), yttria stabilized zirconia (YSZ), mullite ($3AL_2O_3$-$2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal glass composites, and any combinations thereof (e.g., alumina and YSZ or ceria and YSZ). In the case of YSZ, by substituting a certain amount of zirconium ions ($Zr^{4+}$) with slightly larger yttrium ions ($Y^{3+}$), stable sintered x YSZ (x represents mol % of yttrium ions, e.g., 8YSZ), can be obtained. TBC 100 may include additional layers such as a thermally grown oxide.

Combustor 40 and, more particularly, AM combustor body 44, also includes at least one adaptive cooling passage 110 defined in at least one of the combustion liner 52 and transition piece 54. Each adaptive cooling passage 110 includes an open end 112 in fluid communication with coolant air source 80 and a terminating end 114 in AM combustor body 44 spaced from inner surface 48 by a distance D. In certain embodiments, distance D may be in a range of, for example, 1.70 to 2.70 millimeters (mm) (0.030 to 0.066 inches). In other embodiments, distance may be approximately 2.29 mm (0.09 inches). Although shown as generally radially extending, adaptive cooling passages 110 may have any path within AM combustor body 44. Adaptive cooling passages 110 may have any cross-sectional shape, e.g., round, oblong, polygonal, etc. Adaptive cooling passages 110 may have any desired cross-sectional area, but in certain embodiments are "microchannels," which means they have a hydraulic diameter of less than 1 millimeter.

Adaptive cooling passages 110 may be positioned in any location where damage to TBC 100 may be anticipated. In certain embodiments, AM combustor body 44 operation may be modeled, or empirical data can be used, to identify locations that may warrant an adaptive cooling passage 110. For example, locations that exhibit temperatures that will cause the material to oxidize within the intended service interval of the combustion hardware if TBC were to spall, i.e., hot spots, or other environmental conditions that typically lead to damage to TBC 100, e.g., spalls 120, can be identified. In FIG. 2, for example, adaptive cooling passages 110 are shown just downstream of head end assembly 58, around AFS injectors 56, and just upstream of aft frame 70. It will be recognized that a variety of alternative locations within the combustor are possible.

Figure 5:
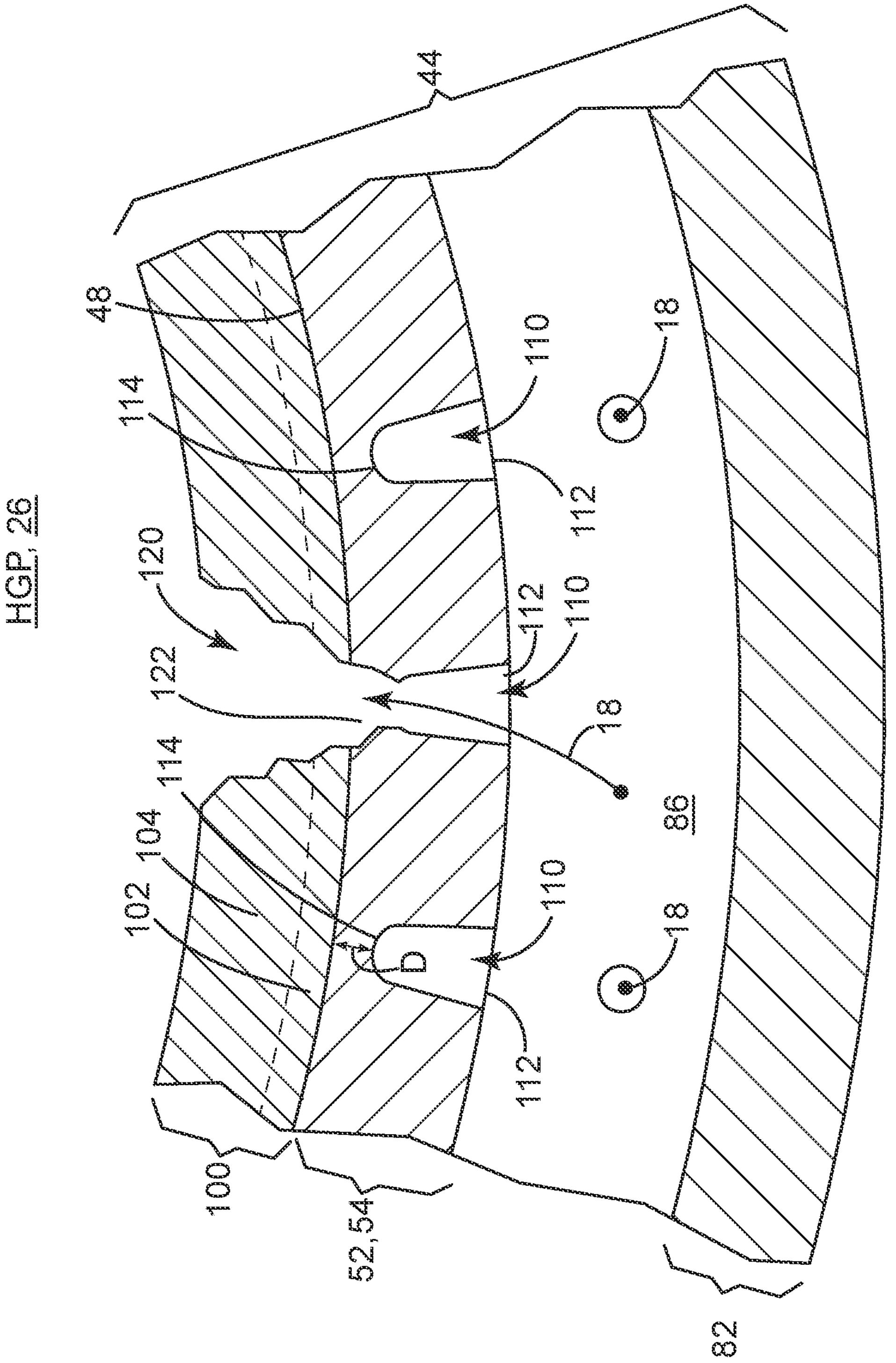
FIG. 5 shows a cross-sectional view along view line A-A in FIG. 2 of a portion of a combustion liner or transition piece of a combustor after a spall occurs according to embodiments of the disclosure.

FIG. 5 shows a cross-sectional view along view line A-A (two possible locations) in FIG. 2 of the portion of inner surface 48 of combustion liner 52 or transition piece 54 of AM combustor body 44 after a spall 120 occurs in TBC 100. Spall 120 may include any change in TBC 100 creating a thermal path to inner surface 48 from the HGP not previously present, e.g., a break, crack, and/or displacement. Spall size may vary widely. If a spall 120 occurs in TBC 100 of AM combustor body 44, the local temperature of the body at the spall may rise to a harmful temperature. When spall

120 occurs, inner surface 48 would normally be exposed to the high temperatures and other extreme environments of the HGP, where prior to spall 120 occurring inner surface 48 was protected by TBC 100. This situation may arise even though internal flow passages 86 are present within AM combustor body 44 at the location of the spall. As shown in FIG. 5, in response to spall 120 in TBC 100 occurring at a location adjacent terminating end 114 and the high temperature reaching or exceeding a predetermined temperature of AM combustor body 44, terminating end 114 opens at the location through distance D to allow a flow of coolant air 18 through to an inside of AM combustor body 44.

As used herein, the “predetermined temperature of AM combustor body” 44 is a temperature at which at least a portion of combustor body 44 will change state in such a way as to allow its removal to create an opening 122 therein. In many cases, as shown in FIG. 5, exposure of AM combustor body 44 having distance D to the HGP environment alone will provide the predetermined temperature sufficient for removal of AM combustor body 44, e.g., through oxidation, sublimation, ashing or melting thereof. That is, the high temperature of the HGP causes a deterioration, or removal of material within distance D at the location, creating opening 122 to adaptive cooling passage 110 at the location. After spall 120 occurs and the adaptive cooling passage 110 opens, coolant air 18 passes through opening 122 to inner surface 48 and the HGP. That is, because internal coolant air source 80 is fluidly coupled to adaptive cooling passage(s) 110, e.g., via flow passage 86 or other passage, coolant air 18 passes through opening 122 and serves to cool AM combustor body 44, despite spall 120. The cooling extends the life of combustor 40 and prevents additional damage. In any event, the extent of spall 120 may determine the extent of terminating end 114 that is opened (at opening 122) and hence the amount of cooling. While one spall 120 is shown in FIG. 5, any number of spalls 120 may be present, resulting in a corresponding number of adaptive cooling passages 110 being opened.

Figure 6:
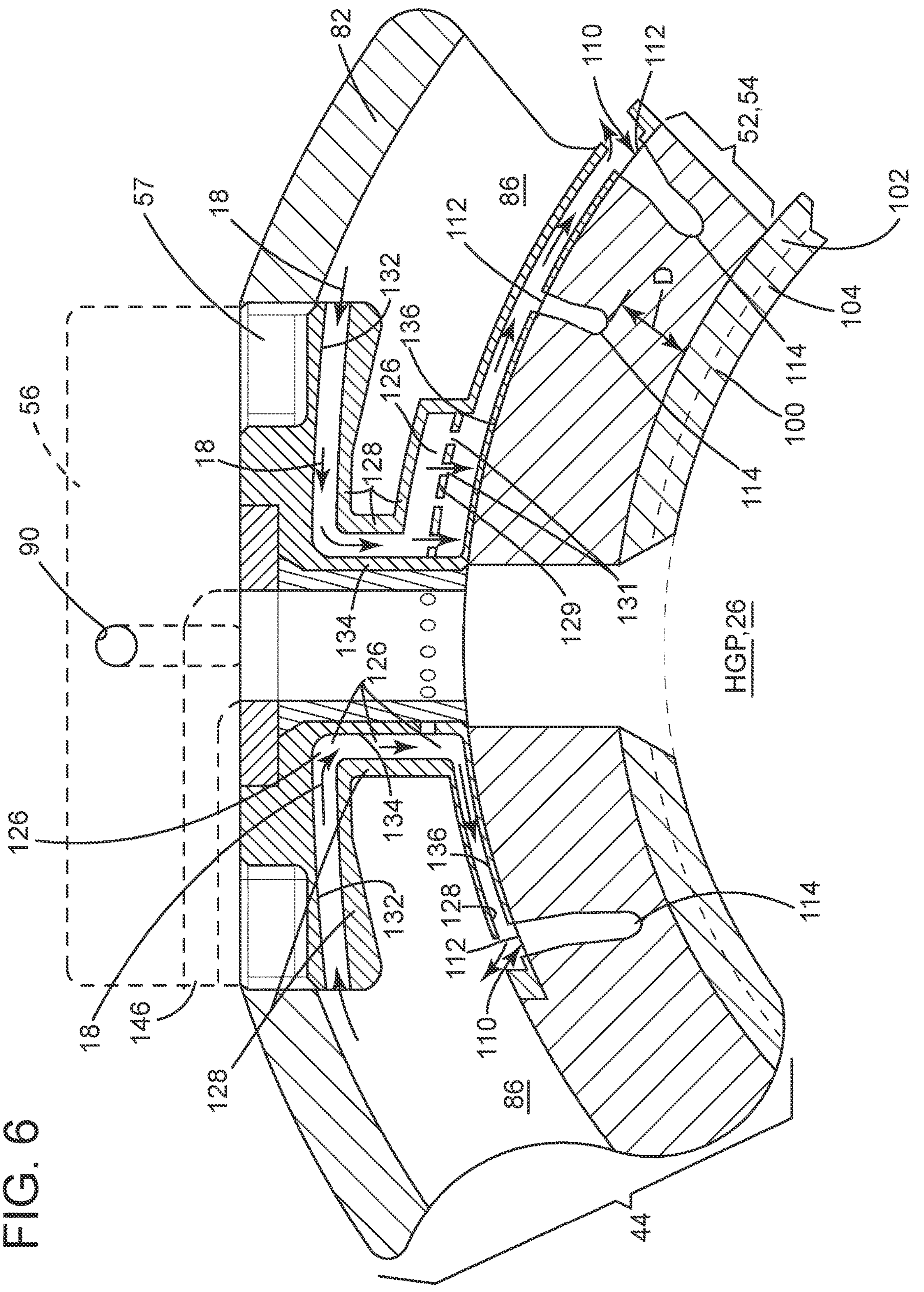
FIG. 6 shows a cross-sectional view along view line 6-6 in FIG. 2 of a portion of an axial fuel stage (AFS) injector of a combustor with an additively manufactured combustor body according to embodiments of the disclosure.

FIG. 6 shows a cross-sectional view along view line 6-6 in FIG. 2 of AFS injector mount 57 for an AFS injector 56 (shown in dashed lines) of combustor 40 according to alternative embodiments. In certain embodiments, AM combustor body 44 may further include a cooling passage 126 that extends adjacent at least a portion of at least one AFS injector mount 57 and that is in fluid communication with at least one adaptive cooling passage 110. Coolant air 18 enters AFS cooling passage from flow passage 86. Cooling passage 126, i.e., AFS mount cooling passage 126, may fluidly couple to one or more adaptive cooling passage(s) 110. FIG. 6 shows two different arrangements for cooling passage 126. On the right side of FIG. 6, AFS cooling passage 126 may be formed by a wall 128 extending in a spaced manner along a radially inner facing periphery 132, a radially extending periphery 134 of AFS injector mount 57 and then along an outer surface 136 of combustion liner 52 or transition piece 54. An inner wall 129 may be positioned in cooling passage 126 (right side) and include a number of impingement openings 131 therein. When adaptive cooling passage(s) 110 is closed, coolant air 18 passes through AFS cooling passage 126 and back out to flow passage 86. When adaptive cooling passage(s) 110 is open, coolant air 18 passes through AFS cooling passage 126 and at least part thereof exits through adaptive cooling passage(s) 110. On the left side of FIG. 6, AFS cooling passage 126 may be formed by a wall 128 extending in a spaced manner along a radially inner facing periphery 132, a radially extending periphery 134 of AFS injector mount 57 and then along an outer surface 136 of combustion liner 52 or transition piece 54. Inner wall 129 is omitted on the left side of FIG. 6. When adaptive cooling passage(s) 110 is closed, coolant air 18 passes through AFS cooling passage 126 and back out to flow passage 86. When adaptive cooling passage(s) 110 is open, coolant air 18 passes through AFS cooling passage 126 and at least part thereof exits through adaptive cooling passage(s) 110. Each arrangement in FIG. 6 may be used alone (around all or part of AFS injector mount 57), or they may be used together (with each around part of AFS injector 57 (as shown)). In any event, AFS cooling passage 126 may extend to one or more adaptive cooling passage(s) 110 in AM combustor body 44. In any event, AFS cooling passage 126 may be in the form of a microchannel or may be slightly larger than a microchannel. AFS injector mount 57 and AFS cooling passage 126 may be additively manufactured with the rest of AM combustor body 44.

As shown in FIG. 2, combustor 40 generally terminates at a point that is adjacent to a first stage 140 of stationary nozzles 142 of turbine 28. First stage 140 of stationary nozzles 142 at least partially defines turbine inlet 38 to turbine 28. Combustion liner 52 at least partially defines the HGP for routing combustion gases 26 from primary combustion zone 66 and secondary combustion zone 68 to turbine inlet 38 of turbine 28 during operation of GT system 10.

In operation, compressed air 18 flows from compressor 16 and is routed through various fluid flow passage(s). A portion of compressed air 18 is routed through flow sleeve 82 around combustion liner 52 and/or transition piece 54 to head end assembly 58 of combustor 40, where it reverses direction and is directed through axially extending fuel nozzle(s) 64. Compressed air 18 is mixed with fuel 20 to form a first combustible mixture that is injected into primary combustion zone 66. The first combustible mixture is burned to produce combustion gases 26. A second portion of compressed air 18 may be routed through the radially extending AFS injectors 56 where it is mixed with fuel 20 from fuel passages 90 (e.g., conduits from fuel supply 22 provided as external tubes (shown) or in flow sleeve(s) 82) to form a second combustible mixture. The second combustible mixture is injected through liner 52 and into the HGP. The second combustible mixture at least partially mixes with combustion gases 26 and is burned in secondary combustion zone 68. As noted, combustion liner 52 (and transition piece 54) at least partially define the HGP for routing combustion gases 26 from primary combustion zone 66 and secondary combustion zone 68 to turbine inlet 38 of turbine 28 during operation of GT system 10.

As GT system 10 operates, compressed air 18 also enters coolant air source 80 and then a number of passages, including adaptive cooling passage 110 and, where provided, AFS cooling passage 126. For example, air 18 can be introduced to flow passage 86 via openings 150 (FIG. 2) in flow sleeve(s) 82. Air 18 within flow passage 86 between flow sleeve(s) 82 and combustion liner 52 and/or transition piece 54 is directed to inlet(s) 146 of AFS injector(s) 56 where it is used for combustion with fuel 20 in secondary combustion zone 68. In any event, air 18 also enters adaptive cooling passages 110. As shown in FIG. 5, when a spall 120 occurs in TBC 100, adaptive cooling passage 110 may deliver air 18 through combustion liner 52 and/or transition piece 54 at the location of the spall.

Figure 7:
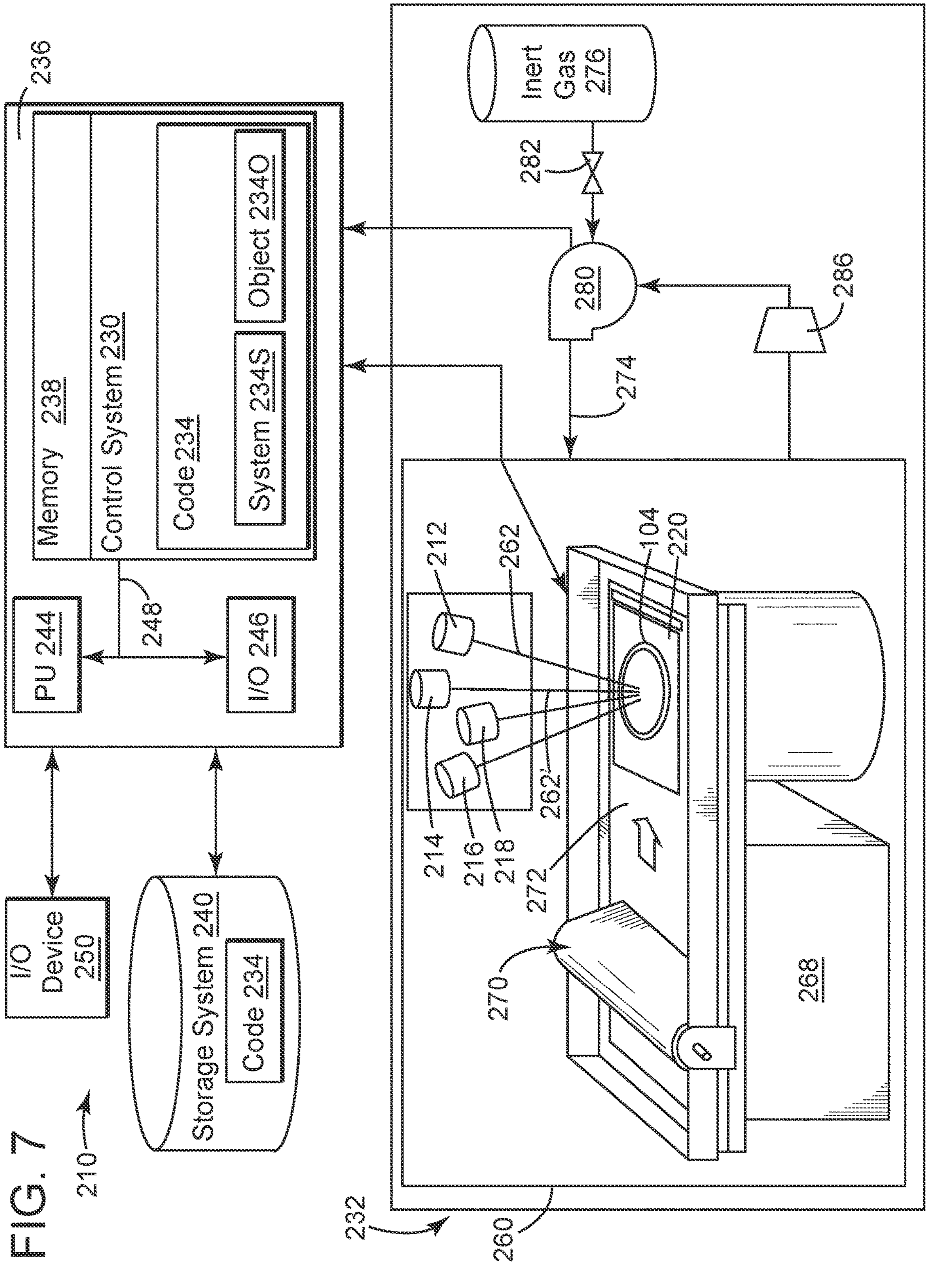
FIG. 7 shows a schematic block diagram of an illustrative additive manufacturing system for additively manufacturing a combustor body according to embodiments of the disclosure.

Combustor 40 and AM combustor body 44 may be additively manufactured using any now known or later developed technique capable of forming the large, integral body. FIG. 7 shows a schematic/block view of an illustrative computerized metal powder additive manufacturing system 210 (hereinafter 'AM system 210') for generating AM combustor body 44, of which only a single layer is shown. The teachings of the disclosures will be described relative to building AM combustor body 44 using multiple melting beam sources 212, 214, 216, 218, but it is emphasized and will be readily recognized that the teachings of the disclosure are equally applicable to build AM combustor body 44 using any number of melting beam sources. In this example, AM system 210 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of AM combustor body 44 in build platform 220 is illustrated in FIG. 7 as a circular element; however, it is understood that the additive manufacturing process can be readily adapted to manufacture any shaped part of AM combustor body 44 on build platform 220.

AM system 210 generally includes an additive manufacturing control system 230 ("control system") and an AM printer 232. As will be described, control system 230 executes set of computer-executable instructions or code 234 to generate combustor body 44 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.).

Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate combustor body 44. Code 234 can include, among other things, a set of computer-executable instructions 234S (herein also referred to as 'code 234S') for operating AM printer 232, and a set of computer-executable instructions 234O (herein also referred to as 'code 234O') defining AM combustor body 44 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

The set of computer-executable instructions 234O defining combustor body 44 may include a precisely defined 3D model of combustor body 44 and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of combustor body 44 may be translated between different formats. For example, code 234O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 234O representative of combustor body 44 may also be converted into a set of data signals and transmitted, received as a set of data signals and converted to code, stored, etc., as necessary. Code 234O may be configured according to embodiments of the disclosure to allow for formation of border and internal sections in overlapping field regions, as will be described. In any event, code 234O may be an input to AM system 210 and may come from a part designer, an intellectual property (IP) provider, a design company, the operator or owner of AM system 210, or from other sources. In any event, control system 230 executes code 234S and 234O, dividing combustor body 44 into a series of thin slices that assembles using AM printer 232 in successive layers of material.

AM printer 232 may include a processing chamber 260 that is sealed to provide a controlled atmosphere for combustor body 44 printing. A build platform 220, upon which combustor body 44 is built, is positioned within processing chamber 260. A number of melting beam sources 212, 214, 216, 218 are configured to melt layers of metal powder on build platform 220 to generate combustor body 44. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 234O. For example, in FIG. 7, melting beam source 212 is shown creating a layer of combustor body 44 using melting beam 262 in one region, while melting beam source 214 is shown creating a layer of combustor body 44 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 7, an applicator (or re-coater blade) 270 may create a thin layer of raw material 272 spread out as the blank canvas from which each successive slice of the final combustor body 44 will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 268 accessible by applicator 270. In the instant case, combustor body 44 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 52, CM 247, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate combustor body 44 according to embodiments of the disclosure. While a particular AM system 210 has been described herein, it is emphasized that the teachings of the disclosure are not limited to any particular additive manufacturing system or method.

Once AM combustor body 44 is formed, as shown in FIG. 2, it may be assembled with other parts of combustor 40 and/or connected to turbine inlet 38. For example, head end assembly 58 may be coupled to forward end 60 of combustor body 44. Head end assembly 58 may be coupled in any now known or later developed fashion, such as welding or fasteners. In addition, turbine inlet 38 may be coupled to aft frame 70. Aft frame 70 may be coupled to turbine inlet 38 in any now known or later developed fashion, such as welding or fasteners. Either end of combustor body 44 may be joined to other components using seals, in addition to or instead of fasteners or weld joints.

The disclosure provides various technical and commercial advantages, examples of which are discussed herein. The AM combustor body extends the lifespan of the combustor by providing adaptive cooling when spalls occur. As noted, the adaptive cooling does not impact GT system efficiency and is inexpensive to implement with additive manufacturing. The additive manufacturing lowers the costs of the combustor body by eliminating numerous parts and many of the required assembly steps. The AM combustor body also provides increased durability. Additive manufacture also allows for quick and easy manufacturing updates, e.g., to position adaptive cooling passages where necessary in different combustor models.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate+/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A combustor for a gas turbine system, the combustor comprising:

an additively manufactured (AM) combustor body including a one-piece member including a combustion liner and a transition piece at an aft end of the combustion liner, wherein the AM combustor body has an inner surface and includes a plurality of parallel, sintered metal layers;

a thermal barrier coating over the inner surface, the thermal barrier coating exposed to a working fluid having a high temperature;

at least one adaptive cooling passage defined in at least one of the combustion liner and the transition piece, wherein each adaptive cooling passage of the at least one adaptive cooling passage includes an open end in fluid communication with a coolant air source and a terminating end in the AM combustor body spaced from the inner surface by a distance; and an axial fuel stage (AFS) injector mount integral with the AM combustor body, wherein the AFS injector mount includes a first internal wall extending along a radially inner facing periphery of the AFS injector mount and a second internal wall spaced from the radially inner facing periphery of the AFS injector mount, the first and second internal walls forming an internal cooling passage that extends through the AFS injector mount and is in fluid communication with the at least one adaptive cooling passage;

wherein, in response to a spall in the thermal barrier coating occurring at a location adjacent the terminating end of the at least one adaptive cooling passage and the high temperature reaching or exceeding a predetermined temperature of the AM combustor body, the terminating end of the at least one adaptive cooling passage opens at the location through the distance to allow a flow of the coolant air from the internal cooling passage through the AFS injector mount to an inside of the AM combustor body.

2. The combustor of claim 1, wherein the AM combustor body further includes at least one flow sleeve surrounding at least part of the combustion liner.

3. The combustor of claim 2, wherein the coolant air source includes a flow passage between the at least one flow sleeve and an exterior of the combustion liner or the transition piece.

4. The combustor of claim 2, wherein the AM combustor body includes at least one fuel passage extending longitudinally in the at least one flow sleeve from a forward end thereof to an AFS injector coupled to the AFS injector mount.

5. The combustor of claim 2, wherein the AM combustor body further includes an aft frame at an aft end of the transition piece.

6. The combustor of claim 1, wherein the AFS injector mount further includes a third internal wall including a set of impingement openings therein for directing the coolant air in the internal cooling passage against a surface of at least one of the combustion liner and the transition piece.

7. The combustor of claim 1, further comprising a separate head end fuel nozzle assembly coupled to a forward end of the AM combustor body.

8. A gas turbine (GT) system, comprising:

a compressor section;

a combustion section operatively coupled to the compressor section; and a turbine section operatively coupled to the combustion section, wherein the combustion section includes at least one combustor including:

an additively manufactured (AM) combustor body including a one-piece member including a combustion liner and a transition piece at an aft end of the combustion liner, wherein the AM combustor body has an inner surface and includes a plurality of parallel, sintered metal layers;

a thermal barrier coating over the inner surface, the thermal barrier coating exposed to a working fluid having a high temperature;

at least one adaptive cooling passage defined in at least one of the combustion liner and the transition piece, wherein each adaptive cooling passage of the at least one adaptive cooling passage includes an open end in fluid communication with a coolant air source and a terminating end in the AM combustor body spaced from the inner surface by a distance; and an axial fuel stage (AFS) injector mount integral with the AM combustor body, wherein the AFS injector mount includes a first internal wall extending along a radially inner facing periphery of the AFS injector mount and a second internal wall spaced from the radially inner facing periphery of the AFS injector mount, the first and second internal walls forming an internal cooling passage that extends through the AFS injector mount and is in fluid communication with the at least one adaptive cooling passage;

wherein, in response to a spall in the thermal barrier coating occurring at a location adjacent the terminating end of the at least one adaptive cooling passage and the high temperature reaching or exceeding a predetermined temperature of the AM combustor body, the terminating end of the at least one adaptive cooling passage opens at the location through the distance to allow a flow of the coolant air from the internal cooling passage through the AFS injector mount to an inside of the AM combustor body.

9. The GT system of claim 8, wherein the AM combustor body further includes at least one flow sleeve surrounding at least part of the combustion liner.

10. The GT system of claim 9, wherein the AFS injector mount further includes a third internal wall including a set of impingement openings therein for directing the coolant air in the internal cooling passage against a surface of at least one of the combustion liner and the transition piece.

11. The GT system of claim 9, wherein the coolant air source includes a flow passage between the at least one flow sleeve and an exterior of the combustion liner or the transition piece.

12. The GT system of claim 9, wherein the AM combustor body includes at least one fuel passage extending longitudinally in the at least one flow sleeve from a forward end thereof to an AFS injector coupled to the AFS injector mount.

13. The GT system of claim 9, wherein the AM combustor body further includes an aft frame at an aft end of the transition piece.

14. The GT system of claim 8, further comprising a separate head end fuel nozzle assembly coupled to a forward end of the AM combustor body.

15. The GT system of claim 8, wherein the combustion section includes a plurality of combustors, each combustor including the AM combustor body.

* * * * *